(12) United States Patent
Li et al.

(10) Patent No.: US 10,110,102 B2
(45) Date of Patent: Oct. 23, 2018

(54) SINGLE PHASE BRUSHLESS MOTOR

(71) Applicant: JOHNSON ELECTRIC S.A., Murten (CH)

(72) Inventors: Yue Li, Hong Kong (CN); Chui You Zhou, Hong Kong (CN); Gang Li, Hong Kong (CN); Yong Wang, Hong Kong (JP); Yong Li, Hong Kong (CN); Wei Zhang, Hong Kong (CN); Ming Chen, Hong Kong (CN); Jie Chai, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 354 days.

(21) Appl. No.: 14/965,303

(22) Filed: Dec. 10, 2015

(65) Prior Publication Data

US 2016/0172948 A1    Jun. 16, 2016

(30) Foreign Application Priority Data

Dec. 11, 2014 (CN) .......................... 2014 1 0765091
May 21, 2015 (CN) .......................... 2015 1 0262232

(51) Int. Cl.
*H02K 17/10* (2006.01)
*H02K 17/04* (2006.01)
(Continued)

(52) U.S. Cl.
CPC ............. *H02K 17/04* (2013.01); *H02K 1/141* (2013.01); *H02K 1/146* (2013.01); *H02K 1/185* (2013.01); *H02K 9/02* (2013.01); *H02K 21/225* (2013.01)

(58) Field of Classification Search
CPC .......................... H02K 1/146; H02K 21/225
(Continued)

(56) References Cited

U.S. PATENT DOCUMENTS 4,048,548 A * 9/1977 Nakajima .............. G04C 13/11
310/162
6,227,822 B1 * 5/2001 Chen ....................... F04D 25/08
310/63
(Continued)

FOREIGN PATENT DOCUMENTS

CN      103618427 A     3/2014
EP      0786851 A1      7/1997
(Continued)

*Primary Examiner* — Hanh Nguyen
(74) *Attorney, Agent, or Firm* — Muncy, Geissler, Olds & Lowe, P.C.

(57) ABSTRACT

A single phase brushless motor includes a stator and a rotor. The stator includes a stator core and stator windings wound on the stator core. The stator core includes a yoke portion, and first and second pole portions extending inwardly from the yoke portion. An end surface of the first pole portion includes a first arc surface having a first groove. An end surface of the second pole portion includes a second arc surface having a second groove. The first and second arc surfaces are opposed to each other and define a receiving space therebetween. The rotor includes a rotary shaft and permanent magnetic poles fixed to the rotary shaft. The permanent magnetic poles are received in the receiving space. A substantially uniform gap is formed between the first arc surface and the second arc surface and the permanent magnetic poles.

17 Claims, 8 Drawing Sheets

(51) Int. Cl.
*H02K 21/22* (2006.01)
*H02K 1/14* (2006.01)
*H02K 1/18* (2006.01)
*H02K 9/02* (2006.01)

(58) Field of Classification Search
USPC ......... 310/216.024, 216.094, 158, 172, 68 B
See application file for complete search history.

(56) References Cited

U.S. PATENT DOCUMENTS

| | | | | |
|---|---|---|---|---|
| 6,548,922 | B1* | 4/2003 | Takahashi | G04C 13/11 |
| | | | | 310/49.33 |
| 9,369,011 | B2* | 6/2016 | Greetham | H02K 1/143 |
| 2012/0119627 | A1 | 5/2012 | Lau et al. | |
| 2015/0214811 | A1* | 7/2015 | Nishidate | H02K 5/22 |
| | | | | 310/68 B |

FOREIGN PATENT DOCUMENTS

| | | |
|---|---|---|
| JP | S4979701 U | 7/1974 |
| JP | S6122743 A | 1/1986 |
| JP | H1118325 A | 1/1999 |
| WO | WO 01/45235 A1 | 6/2001 |
| WO | WO 03/021753 A1 | 3/2003 |

* cited by examiner

SINGLE PHASE BRUSHLESS MOTOR

CROSS REFERENCE TO RELATED APPLICATIONS

This non-provisional patent application claims priority under 35 U.S.C. § 119(a) from Patent Application No. 201510262232.9 filed in The People's Republic of China on May 21, 2015 and Patent Application No. 201410765091.8 filed in The People's Republic of China on Dec. 11, 2014, the entire contents of which are hereby incorporated by reference.

FIELD OF THE INVENTION

This invention relates to motors and in particular, to a high speed single phase brushless motor.

BACKGROUND OF THE INVENTION

In a current single phase brushless motor, in order to avoid a startup dead point, the rotor and the stator usually form a non-uniform gap therebetween. However, the motor with the non-uniform gap usually has a large cogging torque which causes large noise.

SUMMARY OF THE INVENTION

Thus, there is a desire for a single phase brushless motor which can reduce the cogging torque of the single phase brushless motor.

The present invention provides a single phase brushless motor comprising a stator and a rotor. The stator comprises a stator core and stator windings wound around the stator core. The stator core comprises a yoke portion, and a first pole portion and a second pole portion extending inwardly from the yoke portion. An end surface of the first pole portion comprises a first arc surface, and the first arc surface comprises a first groove. An end surface of the second pole portion comprises a second arc surface, and the second arc surface comprises a second groove. The first arc surface and the second arc surface are opposed to each other and define a receiving space therebetween. The rotor comprises a rotary shaft and permanent magnetic poles fixed to the rotary shaft. The permanent magnetic poles are received in the receiving space between the first arc surface and the second arc surface. A substantially uniform gap is formed between the first arc surface and the second arc surface and the permanent magnetic poles.

Preferably, the yoke portion is a ring-shaped yoke portion, the first yoke portion and the second pole portion extend inwardly from the ring-shaped yoke portion, and the rotor forms two permanent magnetic poles. Upon being energized, the stator windings produce two magnetic loops penetrating through the rotor.

Preferably, a first magnetic bridge and a second magnetic bridge are formed between the first pole portion and the second pole portion, and a line connecting a center of the first magnetic bridge and a center of the second magnetic bridge and a center line of the first pole portion form an angle less than or equal to 90 degrees.

Preferably, a first slot and a second slot are formed between two circumferential ends of the first pole portion and two circumferential ends of the second pole portion to thereby separate the first and second pole portions.

Preferably, a width of the first slot and the second slot is greater than zero but less than three times of the width of the uniform gap.

Preferably, an angle formed between a center line of the first pole portion and a line connecting a center of the first slot and a center of the second slot is less than 90 degrees.

Preferably, a first slot and a second slot, are formed between two circumferential ends of the first arc surface and two circumferential ends of the second arc surface, and a width of the first slot and the second slot is greater than zero but less than three times of the width of the uniform gap.

Preferably, the end surface of the first pole portion further comprises a first flat surface and a second flat surface located at two circumferential ends of the first arc surface. The end surface of the second pole portion further comprises a third flat surface and a fourth flat surface located at two circumferential ends of the second arc surface. The first flat surface and the third flat surface are substantially parallel to each other and form the first slot having a uniform width, the second flat surface and the fourth flat surface are substantially parallel to each other and form the second slot having a uniform width, and a line connecting a center of the first slot and a center of the second slot passes through a center of the rotary shaft of the rotor.

Preferably, the width of the first slot is equal to the width of the second slot.

Preferably, a line connecting a center of the first groove and a center of the second groove passes through a center of the rotary shaft of the rotor.

Preferably, the stator core consists of two F-shaped components having the identical shape, with one component forming a half of the yoke portion and the first pole portion, and the other component forming the other half of the yoke portion and the second pole portion.

Preferably, the motor further comprises an outer housing; an end cover disposed at one end of the outer housing; a support bracket mounted in the outer housing, the support bracket including an annular portion and a plurality of connecting members extending outwardly from the annular portion, the connecting members mounted to an inner surface of the outer housing such that the support bracket is spaced a predetermined distance from the end cover.

Preferably, the stator core is square-shaped, with an outwardly extending connecting portion formed at each vertex angle, and an inner surface of the outer housing forms corresponding receiving portions for receiving the connecting portions.

Preferably, multiple ventilation holes are formed at opposite ends of the outer housing, and the stator core and the inner surface of the outer housing form therebetween a flow passage in communication with the ventilation holes.

Preferably, the motor further comprises a circuit board. A sensor is mounted to the circuit board at a location adjacent an axial end of the permanent magnetic poles of the rotor, the axial end of the permanent magnetic poles extends axially beyond the stator core, for cooperating with the sensor to sense a position of the rotor.

In view of the foregoing, the present invention can reduce the cogging effect of the motor, thus reducing the startup current and noise of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
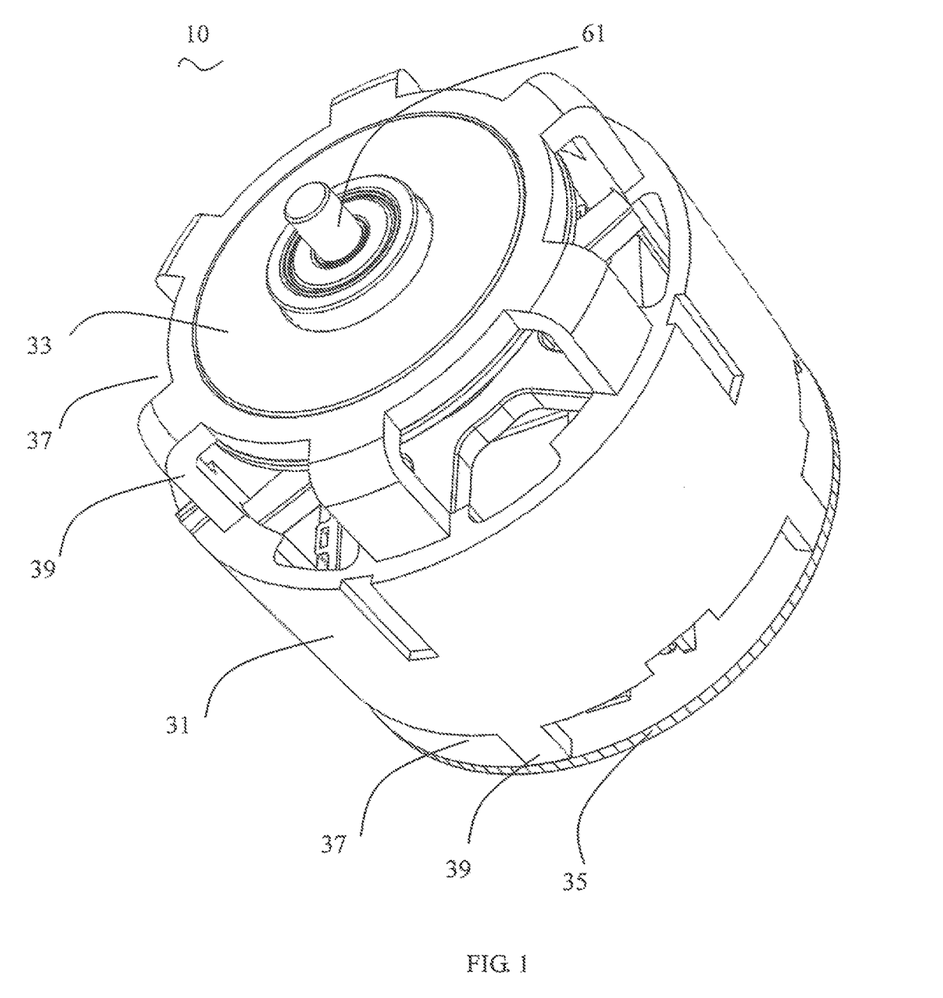
FIG. 1 illustrates a single phase brushless motor according to one embodiment of the present invention.
Figure 2:
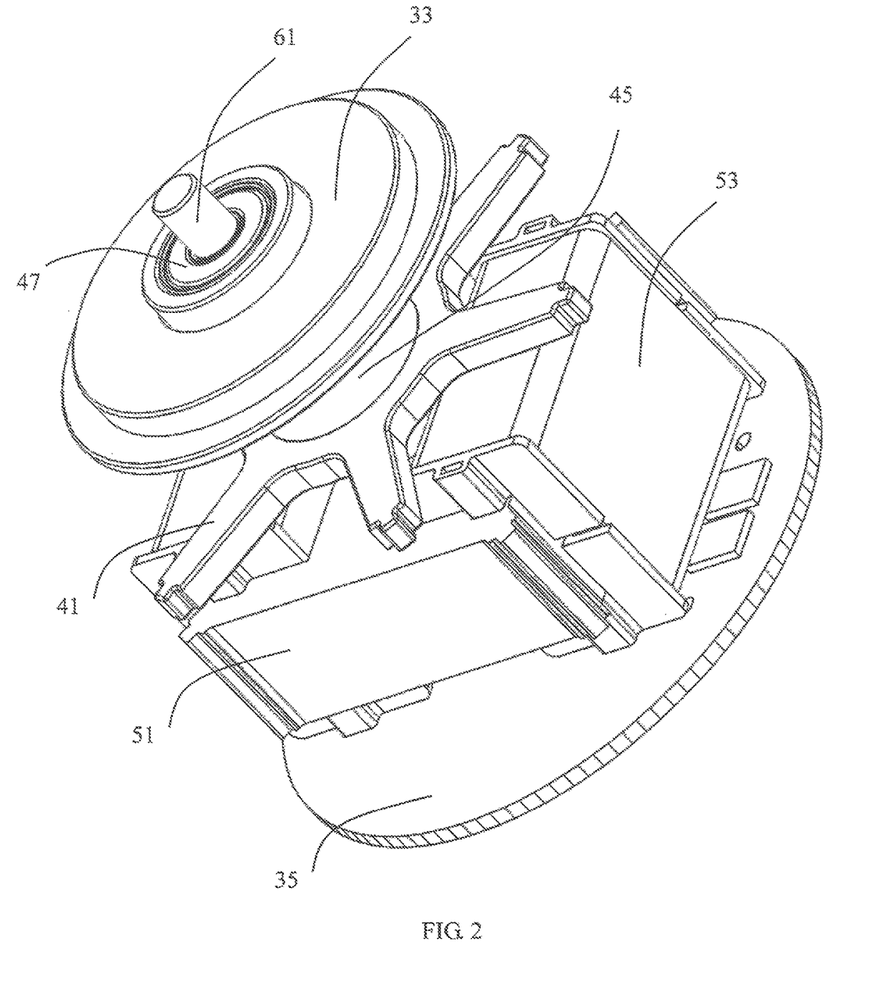
FIG. 2 illustrates the single phase brushless motor of FIG. 1 with the outer housing removed.

Referring to FIG. 1 and FIG. 2, a single phase brushless motor in accordance with one embodiment of the present invention includes a stator and a rotor. The stator includes an outer housing 31, a front end cover 33 mounted to one end of the outer housing 31, a circuit board 35 mounted to another end of the outer housing 31, and a stator core 51 and windings 53 mounted in the outer housing 31. The rotor includes a rotary shaft 61, and permanent magnetic poles (permanent magnetic poles 63 of FIG. 5) made of permanent magnet and fixedly mounted to the rotary shaft 61. The rotor is rotatable mounted in the stator and is rotatable relative to the stator. An output end of the rotary shaft 61 may be connected with a device such as an impeller to be driven.

In this embodiment, multiple openings 37 are formed at each of opposite ends of a annular sidewall of the outer housing 31 for facilitating heat dissipation. A connecting portion 39 is formed between two adjacent openings 37. The outer housing 31 further includes an annular end wall adjacent the front end cover 33 for positioning the front end cover 33 in the outer housing 31. The annular end wall and the annular sidewall are interconnected by a plurality of connecting portions 39. Adjacent connecting portions 39 define the opening 37 therebetween. The openings 37 at opposite ends of the outer housing 31 are in fluid communication with a flow passage formed between the stator core 51 and the outer housing 31. The circuit board 35 is disposed at the end of the outer housing 31 away from the front end cover 33 and is supported and positioned by the corresponding connecting portions 39.

Figure 3:
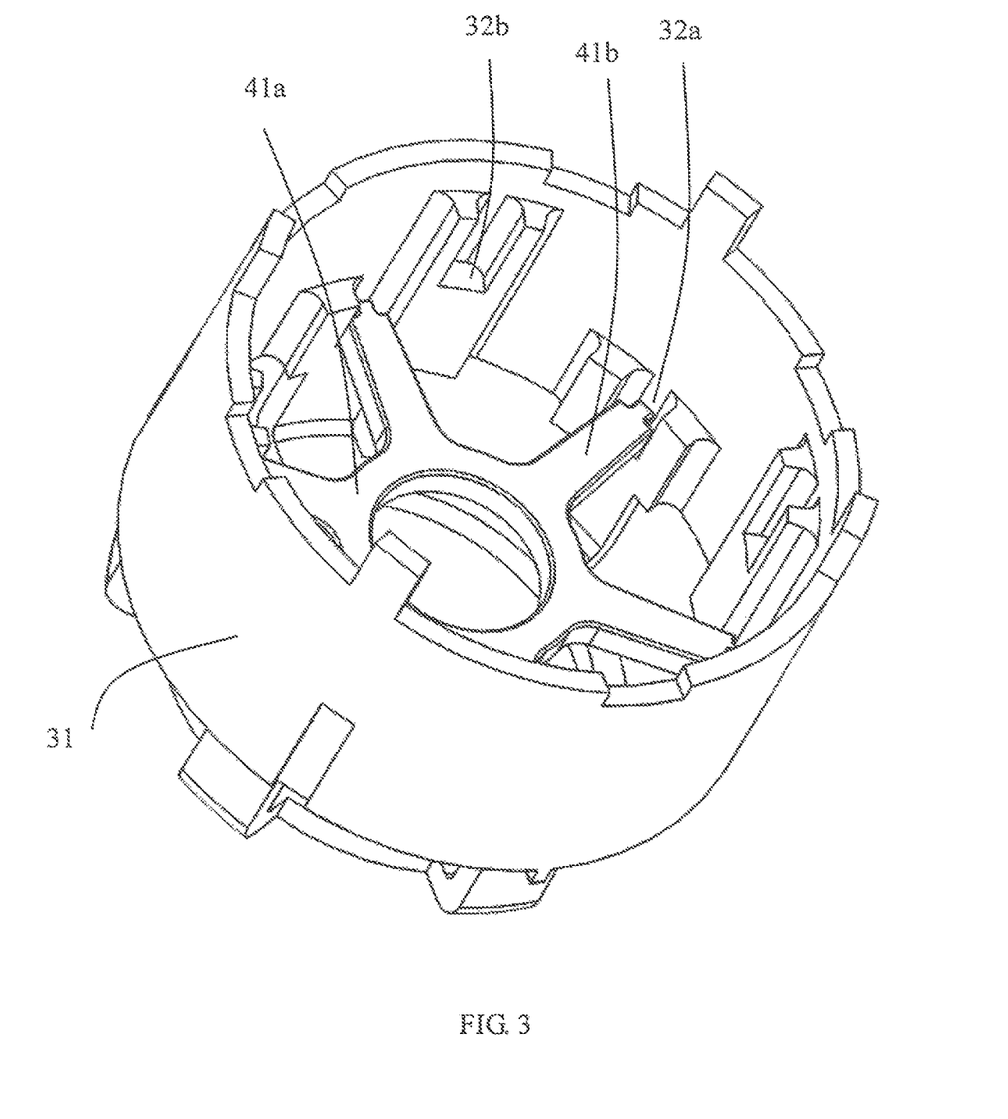
FIG. 3 illustrates the outer housing of the single phase brushless motor of FIG. 1.

Referring to FIG. 2 and FIG. 3, a support bracket 41 is mounted in the outer housing 31. The support bracket 41 includes an annular portion 41a and a plurality of connecting members 41b extending outwardly from the annular portion 41a. The connecting members 41b are mounted to an inner surface of the outer housing 31. Specifically, the inner surface of the outer housing 31 forms a plurality of receiving portions 32a for receiving the connecting members 41b of the support bracket 41, such that the support bracket 41 is spaced a predetermined distance from the end cover 33.

Figure 5:
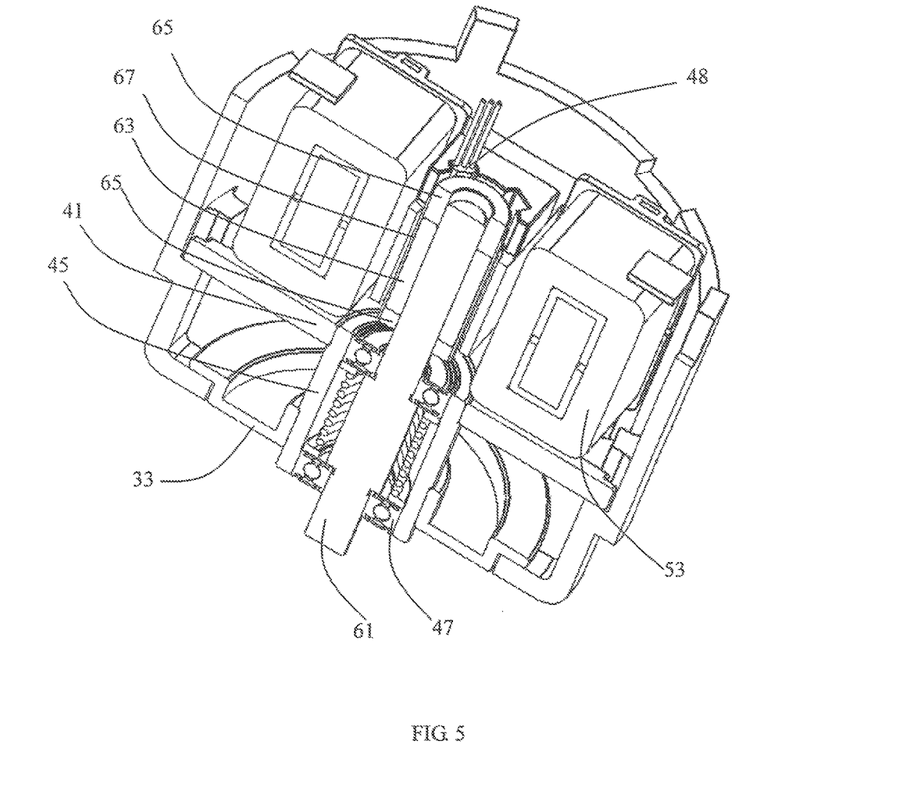
FIG. 5 is a sectional view of the single phase brushless motor of FIG. 1 with the circuit board removed.

Referring to FIG. 2 and FIG. 5, the single phase brushless motor further includes a support structure mounted to the end cover 33 and support bracket 41. The support structure is configured to rotatably support the rotor. In the present embodiment, the support structure includes a barrel member 45 fixed to the end cover 33 and support bracket 41, and a rolling bearing 47 such as a ball bearing mounted in the barrel member 45. The rolling bearing 47 rollingly supports the rotary shaft 61 of the rotor.

Figure 4:
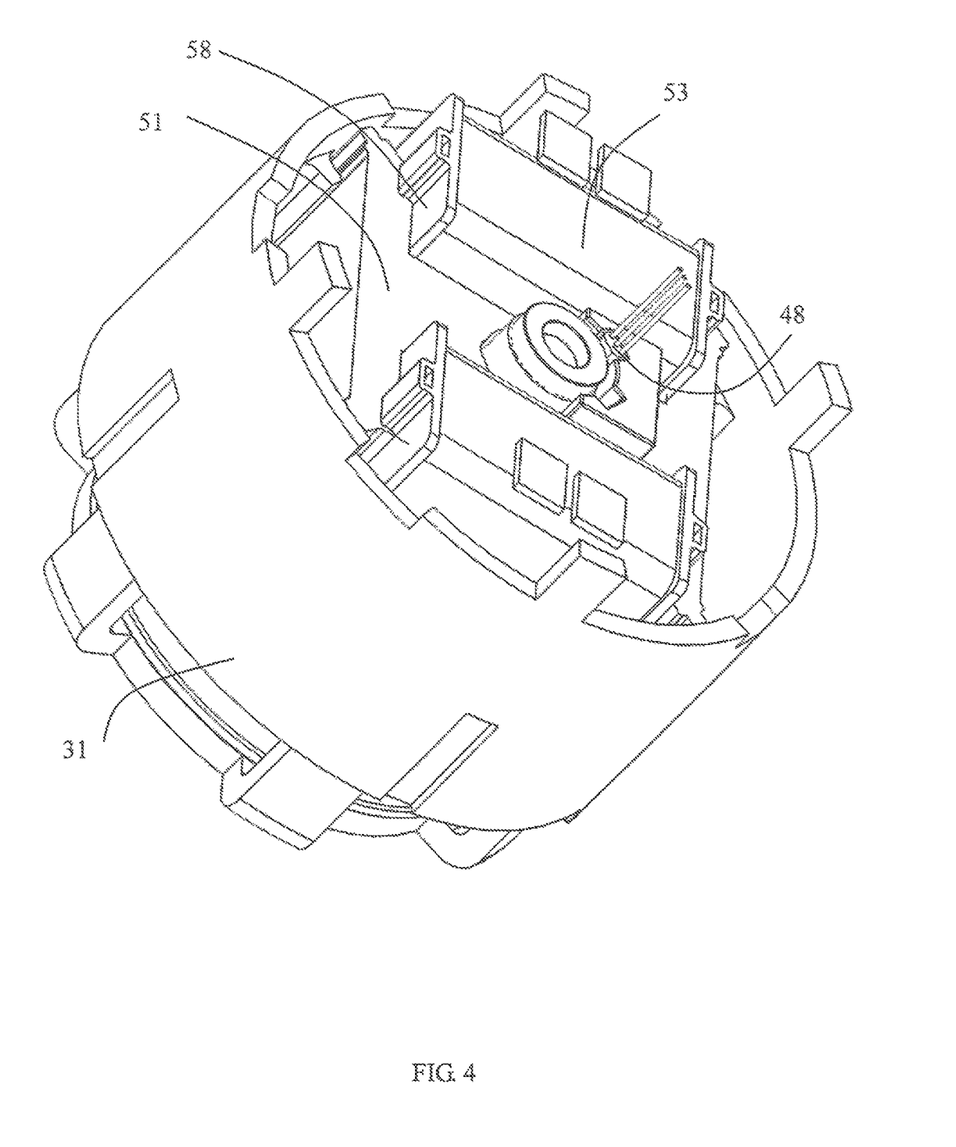
FIG. 4 illustrates the single phase brushless motor of FIG. 1 with the circuit board removed.

Referring to FIG. 4 and FIG. 5, the permanent magnetic poles 63 of the rotor are fixed to the rotary shaft 61. A balance member 65 such as a balance plate/block is disposed at each of opposite ends of the permanent magnetic poles. Preferably, the permanent magnetic poles 63 and the balance member 65 may be positioned within a sleeve 67 to prevent debris of the permanent magnetic poles 63 from splashing out when the permanent magnetic poles 63 being broken during high speed rotation. A sensor such as a Hall sensor 48 is mounted to the circuit board 35 at a location adjacent an axial end of the permanent magnetic poles 63. The axial end of the permanent magnetic poles 63 extends beyond an axial end of the stator core 51 and, preferably, extends 0.2 mm beyond the axial end of the stator core 51. As such, the axial end of the permanent magnetic poles 63 that extends beyond the axial end of the stator core can act as a sensing magnetic ring, which cooperates with the Hall sensor 48 so that a controller of the motor can know the position of the rotor based on signals sent from the sensor 48.

Figure 6:
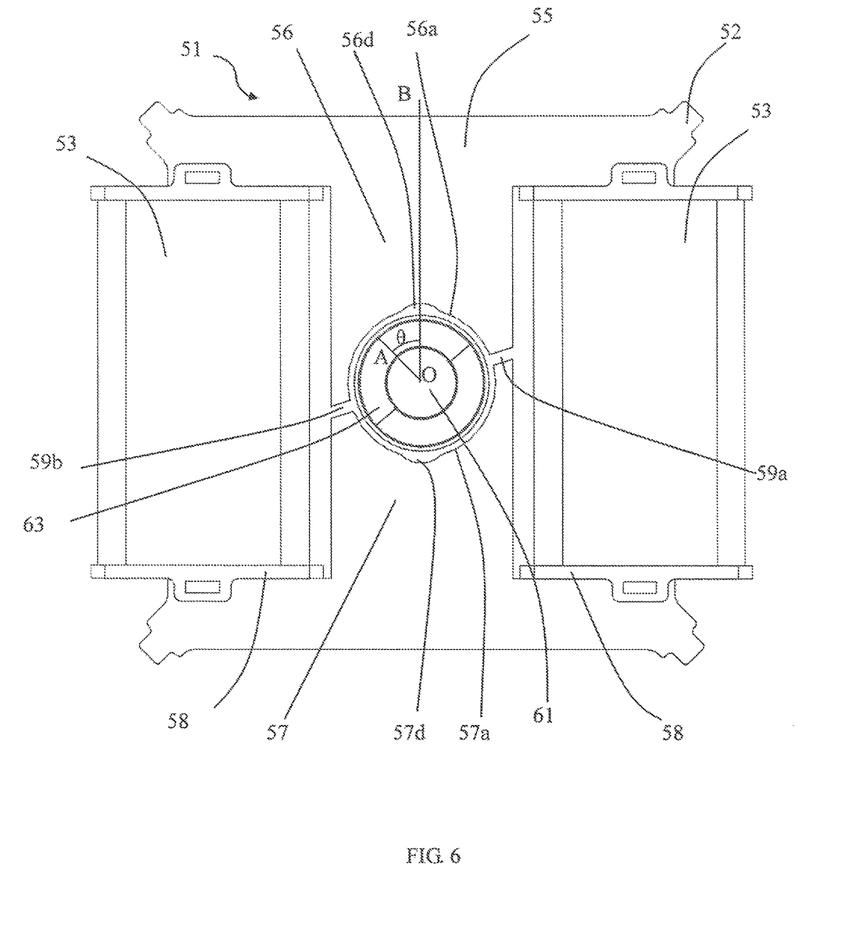
FIG. 6 is a sectional view of the stator core and stator windings of the single phase brushless motor of FIG. 1.
Figure 7:
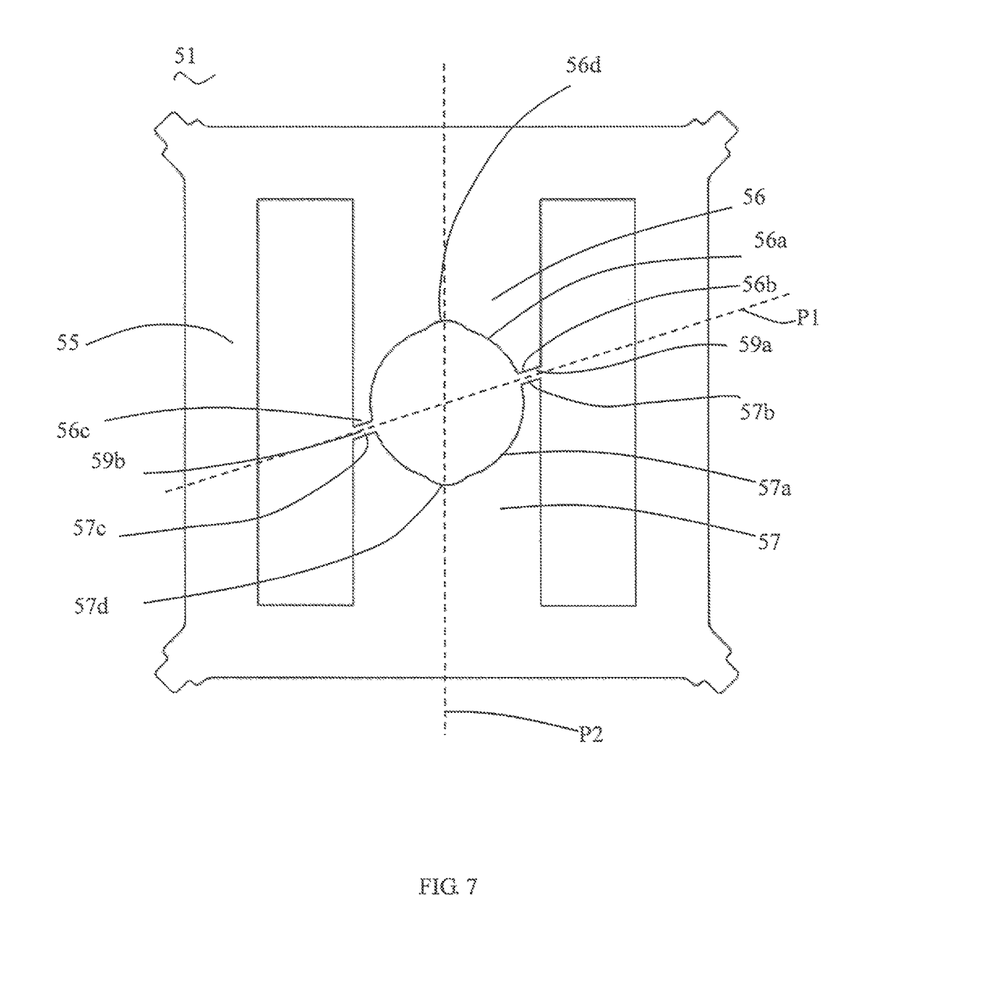
FIG. 7 illustrates the stator core of FIG. 6.

Referring to FIG. 6 and FIG. 7, the stator core 51 includes a ring-shaped (in this embodiment, the ring shape refers to any close-loop shape such as square or circle) yoke portion 55, and a first pole portion 56 and a second pole portion 57 extending inwardly from the yoke portion 55. Preferably, the first pole portion 56 and the second pole portion 57 are equal in width, centers of the two pole portions are aligned with each other, and end faces of the two pole portions are opposed to each other. In this embodiment, the stator includes two windings 53 respectively wound around the yoke portion 55 at opposite sides of the first pole portion 56 and the second pole portion 57. Upon being energized, each winding 53 can produce a magnetic circuit/loop passing through the rotor, and thus a total of two magnetic loops along different paths are produced. An insulating winding bracket 58 may be disposed between the windings 53 and the stator core 51.

In this embodiment, a cross section of the stator core 51 perpendicular to the axial direction is generally in the shape of "H", with an outwardly extending connecting portion 52 formed at each corner of the stator core 51. Receiving portions (receiving portions 32b in FIG. 3) are formed on the inner surface of the outer housing 31, for receiving the connecting portions 52. In the present embodiment, each receiving portion 32b forms an axially-extending receiving slot. In assembly, the connecting portions 52 of the stator core 51 can slide into the receiving slot 32b along the axial direction.

In this embodiment, the end surface of the first pole portion 56 includes a first arc surface 56a, and a first flat surface 56b and a second flat surface 56c at opposite sides of the first arc surface 56a.

The end surface of the second pole portion 57 includes a second arc surface 57a, and a third flat surface 57b and a fourth flat surface 57c at opposite sides of the second arc surface 57a.

The first arc surface 56a and the second arc surface 57a are opposed to each other and cooperatively define a receiving space for receiving the rotor, specifically, for receiving the permanent magnetic poles 63 of the rotor. The first flat surface 56b and the third flat surface 57b are generally parallel to each other and cooperatively define therebetween a first slot 59a having a uniform thickness. The second flat surface 56c and the fourth flat surface 57c are generally parallel to each other and cooperatively define therebetween a second slot 59b having a uniform thickness. The first slot 59a and the second slot 59b have a relatively large magnetic resistance to avoid magnetic short-circuit between the first pole portion 56 and the second pole portion 57.

Preferably, the first slot 59a and the second slot 59b are equal in width. A center line of the first slot 59a and a center line of the second slot 59b are collinear and pass through the center of the rotary shaft of the rotor. The center line PI of the first slot 59a and the second slot 59b is inclined with respect to the center line P2 which passes through the center O of the rotor, of the pole portions 56, 57, and the angle between the center line P1 and the center line P2 is less than or equal to 90 degrees. When the angle between the center lines P1 and P2 is less than 90 degrees, the first pole portion 56 is a non-symmetrical structure with respect to its center line P2, and the second pole portion 57 is also a non-symmetrical structure with respect to its center line P2. This configuration can reduce the induced potential of the motor, thereby increasing the output torque of the motor.

An arc first groove 56d is formed in the first arc surface 56a, and an arc second groove 57d is formed in the second arc surface 57a. The size, shape and position of the first groove 56d and the second groove 57d may vary according to design requirements. The provision of the first groove 56d and the second groove 57d may be used to locate an initial position of the rotor. The size of the openings of the first and second grooves 56d and 57d in the circumferential direction is greater than that of the slots 59a and 59b. Preferably, the size of the openings of the first and second grooves 56d and 57d in the circumferential direction is in the range of 1.5~3 times of that of the slots 59a and 59b. In the present embodiment, the number of the rotor magnetic poles is two. When the rotor is at the initial position, a center line OA of one rotor magnetic pole (south pole or north pole) is deviated from a center line OB of the first pole portion 56 of the stator core 51. The angle θ formed between the lines OA and OB is called the startup angle. In the illustrated embodiment, the startup angle is greater than 45 degrees electrical angle but less than 135 degrees electrical angle. When the stator winding 53 of the motor is energized with a current in one direction, the rotor can be easily rotated in one direction; when the stator winding 50 is energized with a current in an opposite direction, the rotor can be rotated in the opposite direction. It is to be understood that when the startup angle θ is equal to a 90 degrees electrical angle, the rotor 70 can be easily started in both directions, which is the best situation to achieve bi-directional startup of the motor. As the startup angle θ deviates from the 90 degrees electrical angle, startup of the rotor in one direction is easier than in the opposite direction. When the startup angle θ is in the range of 60 to 80 degree electrical angle, the rotor is capable of being started very easily in one direction. It is found that when the startup angle θ is in the range from 45 to 135 degrees electrical angle, the rotor has good startup reliability in both directions. In this embodiment, the center line OA of the rotor magnetic pole is closer to the first groove 56d. As such, as shown in FIG. 6, it is easier for the rotor to start rotating in the counterclockwise direction than in the clockwise direction. Alternatively, it can also be configured so that the center line OA of the rotor magnetic pole is closer to the second slot 59b. In this case, it is easier for the rotor to start rotating in the clockwise direction than in the counterclockwise direction.

Preferably, the portion of the first arc surface 56a other than the grooves 56d and 57d is generally located on one same cylindrical surface. An outer surface of the rotor magnetic poles 63 is generally located on one same cylindrical surface and is radially opposed to the first arc surface 56a, such that a substantially uniform gap is formed between the stator and the rotor. The term "substantially uniform gap" as used herein refers to that a major part (more than 60%) of the stator pole portions and a major part of the rotor form a uniform gap therebetween, and a non-uniform gap is formed at a few parts, such as those corresponding to the grooves 56d and 57d, slots 59a and 59b, and neutral zones between adjacent permanent magnetic poles.

Preferably, the width of the first slot 59a (i.e. the size of the first slot 59a in a direction perpendicular to the first flat surface 56b) is less than three times of the width of the uniform gap between the stator and the rotor. More preferably, the width of the first slot 59a is less than twice of the width of the uniform gap between the stator and the rotor.

Figure 8:
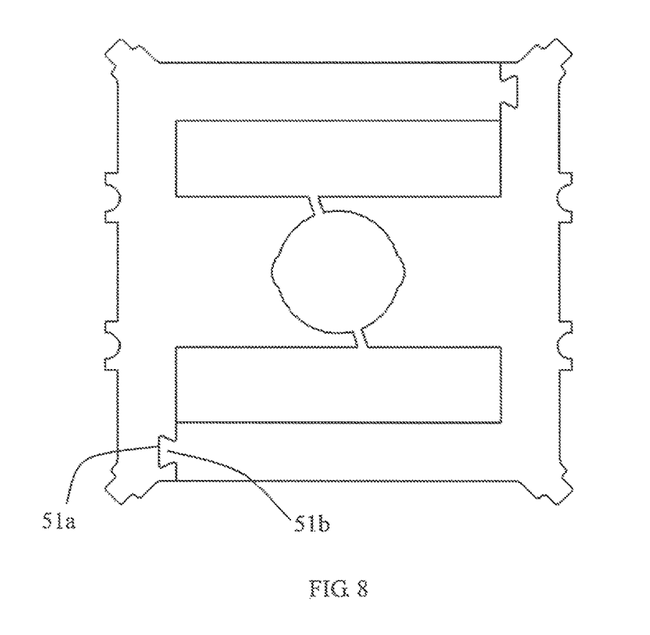
FIG. 8 illustrates the structure of the stator core of FIG. 7.

Referring to FIG. 8, the stator core may consist of two F-shaped components having the identical shape/structure, with one component forming a half of the yoke portion and the first pole portion, and the other component forming the other half of the yoke portion and the second pole portion. One end of each component has a swallowtail-shaped connecting slot 51a, and the other end has a swallowtail-shaped connecting portion 51b. In assembly, the connecting slot and connecting portion of one component are respectively engaged with the connecting portion and connecting slot of the other component.

Figure 9:
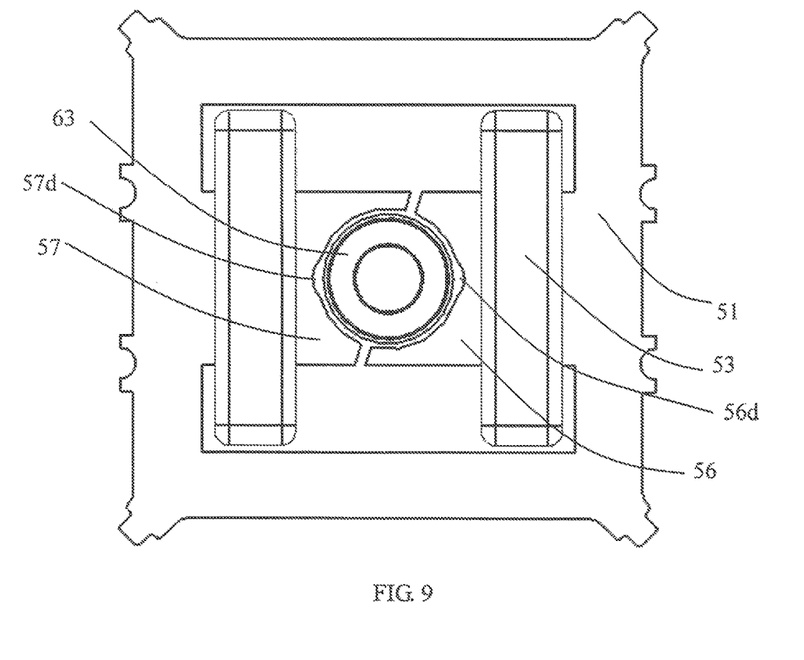
FIG. 9 is a sectional view of the stator core and stator windings of a single phase brushless motor according to another embodiment.

Referring to FIG. 9, the stator windings 53 may be also wound around the first pole portion 56 and the second pole portion 57 of the stator core 51.

In the present invention, the two windings 53 may be electrically connected to a single phase power such that the single phase brushless motor of the present invention can be used as a single phase brushless direct current motor, which is particularly suitable for use in high rotational speed (e.g. higher than 100 krpm) applications such as hand dryers and vacuum cleaners. The maximum speed of the motor of the present invention can be as high as 120 krpm. It is to be noted that the design of the present invention may also be used in a single phase synchronous motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. For example, it is possible that the slots 59a and 59b may not radially penetrate through the pole portions 56 and 57, but are only formed in inner or outer surfaces of the pole portions 56 and 57 to form a magnetic bridge having a large magnetic resistance between the two pole portions. The slots 59a and 59b may be of another shape and may have a uniform width or non-uniform width. In the case of a non-uniform width, the width of the slots 59a and 59b refers to the width between the inner surfaces of the pole portions 56 and 57 at their adjacent ends. The first groove 56d and the second groove 57d may also be of another shape. Besides the square shape, the cross section of the stator core 51 may be of another ring shape such as circle shape. The permanent magnetic poles may be directly fixed to the rotor shaft or indirectly fixed to the rotor shaft by a rotor core which is fixed to the rotor shaft directly. Therefore, the scope of the invention is to be determined by reference to the claims that follow.

The invention claimed is:

1. A single phase brushless motor comprising:
a stator, the stator comprising a stator core and stator windings wound around the stator core, the stator core comprising a yoke portion, and a first pole portion and a second pole portion extending inwardly from the yoke portion, an end surface of the first pole portion comprising a first arc surface, the first arc surface comprising a first groove, an end surface of the second pole portion comprising a second arc surface, the second arc surface comprising a second groove, the first arc surface and the second arc surface being opposed to each other and defining a receiving space therebetween; and
a rotor, the rotor comprising a rotary shaft and permanent magnetic poles fixed to the rotary shaft, the permanent magnetic poles being received in the receiving space formed between the first arc surface and the second arc surface,
wherein major parts of the first arc surface and the second arc surface are located at a circle which is concentric with the rotor; and
wherein circumferential ends of the first pole portion and the second pole portion are connected by a magnetic bridge or separated by a slot, an angle formed between a center line of the first pole portion and a line connecting a center of the rotor and a center of the magnetic bridge or the slot being less than 90 degrees, a first slot and a second slot are formed between two circumferential ends of the first pole portion and two circumferential ends of the second pole portion to thereby separate the first and second pole portions, and the size of an opening of the first groove in a circumferential direction of the rotor is 1.5~3 times of the circumferential width of the first and/or second slots, and/or the size of an opening of the second groove in the circumferential direction of the rotor is 1.5~3 times of that of the first and/or second slots.

2. The single phase brushless motor according to claim 1, wherein the yoke portion is a ring-shaped yoke portion, the first yoke portion and the second pole portion extend inwardly from the ring-shaped yoke portion, the rotor forms two permanent magnetic poles, and upon being energized, the stator windings produce two magnetic circuits passing through the rotor.

3. The single phase brushless motor according to claim 1, wherein a first magnetic bridge and a second magnetic bridge are respectively formed between the circumferential ends of the first pole portion and the second pole portion, an angle formed between a line connecting a center of the first magnetic bridge and a center of the second magnetic bridge and the center line of the first pole portion being less than 90 degrees.

4. The single phase brushless motor according to claim 1, wherein a uniform gap is formed between the first arc surface and the second arc surface and the rotor, a circumferential width of the first slot and the second slot is less than three times of the width of the uniform gap.

5. The single phase brushless motor according to claim 1, wherein an angle formed between the center line of the first pole portion and a line connecting a center of the first slot and a center of the second slot is less than 90 degrees.

6. The single phase brushless motor according to claim 1, wherein the end surface of the first pole portion further comprises a first flat surface and a second flat surface located at two circumferential ends of the first arc surface;
wherein the end surface of the second pole portion further comprises a third flat surface and a fourth flat surface located at two circumferential ends of the second arc surface;
wherein the first flat surface and the third flat surface are parallel to each other and form the first slot having a uniform width, the second flat surface and the fourth flat surface are parallel to each other and form the second slot having a uniform width, and a line connecting a center of the first slot and a center of the second slot passes through a center of the rotary shaft of the rotor.

7. The single phase brushless motor according to claim 6, wherein the width of the first slot is equal to the width of the second slot.

8. The single phase brushless motor according to claim 1, wherein a line connecting a center of the first groove and a center of the second groove passes through a center of the rotary shaft of the rotor.

9. The single phase brushless motor according to claim 1, wherein the stator core consists of two F-shaped components having an identical configuration, with one component forming a half of the yoke portion and the first pole portion, and the other component forming the other half of the yoke portion and the second pole portion.

10. The single phase brushless motor according to claim 1, further comprising:
an outer housing;
an end cover disposed at one end of the outer housing;
a support bracket mounted in the outer housing, the support bracket including an annular portion and a plurality of connecting members extending outwardly from the annular portion, the connecting members mounted to an inner surface of the outer housing such that the support bracket is spaced from the end cover by a predetermined distance.

11. The single phase brushless motor according to claim 10, wherein the stator core is square-shaped, with an outwardly extending connecting portion formed at each vertex angle, and an inner surface of the outer housing forms corresponding receiving portions for receiving the connecting portions.

12. The single phase brushless motor according to claim 11, wherein multiple ventilation holes are formed at opposite ends of the outer housing, and a flow passage in communication with the ventilation holes is formed between the stator core and the inner surface of the outer housing.

13. The single phase brushless motor according to claim 1, wherein the motor further comprises a circuit board, a sensor is mounted to the circuit board at a location adjacent an axial end of the permanent magnetic poles of the rotor, the axial end of the permanent magnetic poles extends axially beyond the stator core, for cooperating with the sensor to sense a position of the rotor.

14. A single phase brushless motor comprising:
a stator, the stator comprising a stator core and stator windings wound around the stator core, the stator core comprising a yoke portion, and a first pole portion and a second pole portion extending inwardly from the yoke portion, an end surface of the first pole portion comprising a first arc surface, the first arc surface comprising a first groove, an end surface of the second pole portion comprising a second arc surface, the second arc surface comprising a second groove, the first arc surface and the second arc surface being opposed to each other and defining a receiving space therebetween; and a rotor, the rotor comprising a rotary shaft and permanent magnetic poles fixed to the rotary shaft, the permanent magnetic poles being received in the receiving space formed between the first arc surface and the second arc surface, wherein major parts of the first arc surface and the second arc surface are located at a circle which is concentric with the rotor;

wherein circumferential ends of the first pole portion and the second pole portion are connected by a magnetic bridge or separated by a slot, an angle formed between a center line of the first pole portion and a line connecting a center of the rotor and a center of the magnetic bridge or the slot being less than 90 degrees; and wherein the stator core consists of two F-shaped components having an identical configuration, with one component forming a half of the yoke portion and the first pole portion, and the other component forming the other half of the yoke portion and the second pole portion.

15. The single phase brushless motor according to claim 14, wherein the stator core is square-shaped, with an outwardly extending connecting portion formed at each vertex angle, and an inner surface of the outer housing fauns corresponding receiving portions for receiving the connecting portions.

16. The single phase brushless motor according to claim 14, wherein multiple ventilation holes are formed at opposite ends of the outer housing, and a flow passage in communication with the ventilation holes is formed between the stator core and the inner surface of the outer housing.

17. A single phase brushless motor comprising:

a stator, the stator comprising a stator core and stator windings wound around the stator core, the stator core comprising a yoke portion, and a first pole portion and a second pole portion extending inwardly from the yoke portion, an end surface of the first pole portion comprising a first arc surface, the first arc surface comprising a first groove, an end surface of the second pole portion comprising a second arc surface, the second arc surface comprising a second groove, the first arc surface and the second arc surface being opposed to each other and defining a receiving space therebetween; and a rotor, the rotor comprising a rotary shaft and permanent magnetic poles fixed to the rotary shaft, the permanent magnetic poles being received in the receiving space formed between the first arc surface and the second arc surface, an outer housing;

an end cover disposed at one end of the outer housing;

a support bracket mounted in the outer housing, the support bracket including an annular portion and a plurality of connecting members extending outwardly from the annular portion, the connecting members mounted to an inner surface of the outer housing such that the support bracket is spaced from the end cover by a predetermined distance;

wherein major parts of the first arc surface and the second arc surface are located at a circle which is concentric with the rotor; and wherein circumferential ends of the first pole portion and the second pole portion are connected by a magnetic bridge or separated by a slot, an angle formed between a center line of the first pole portion and a line connecting a center of the rotor and a center of the magnetic bridge or the slot being less than 90 degrees.

* * * * *